April 30, 1935.  C. D. PETERSON  1,999,615
TRANSMISSION GEARING (HIGH REVERSE GEAR)
Filed July 24, 1933   2 Sheets-Sheet 2
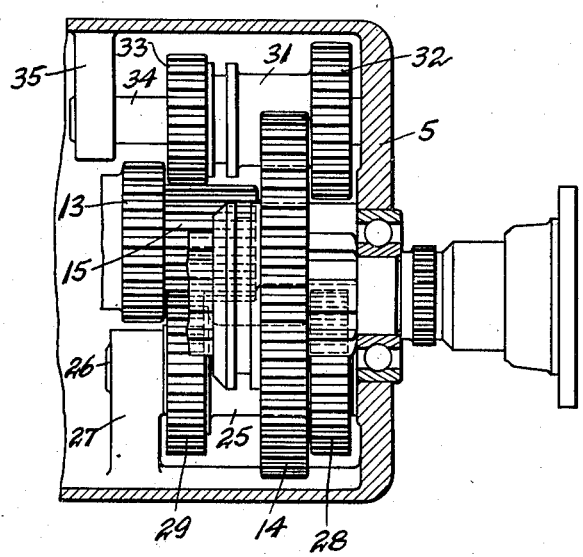
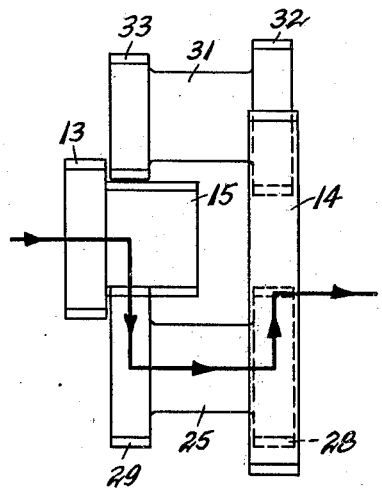 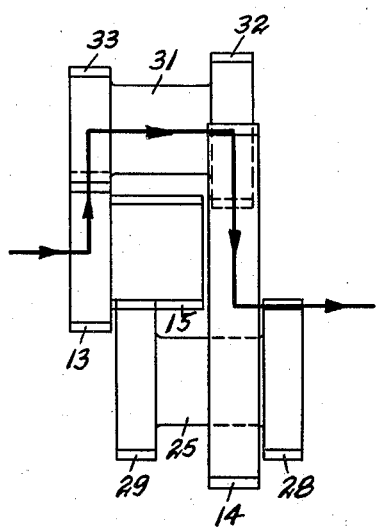
INVENTOR:
Carl D. Peterson,
BY Bodell & Thompson
ATTORNEYS.

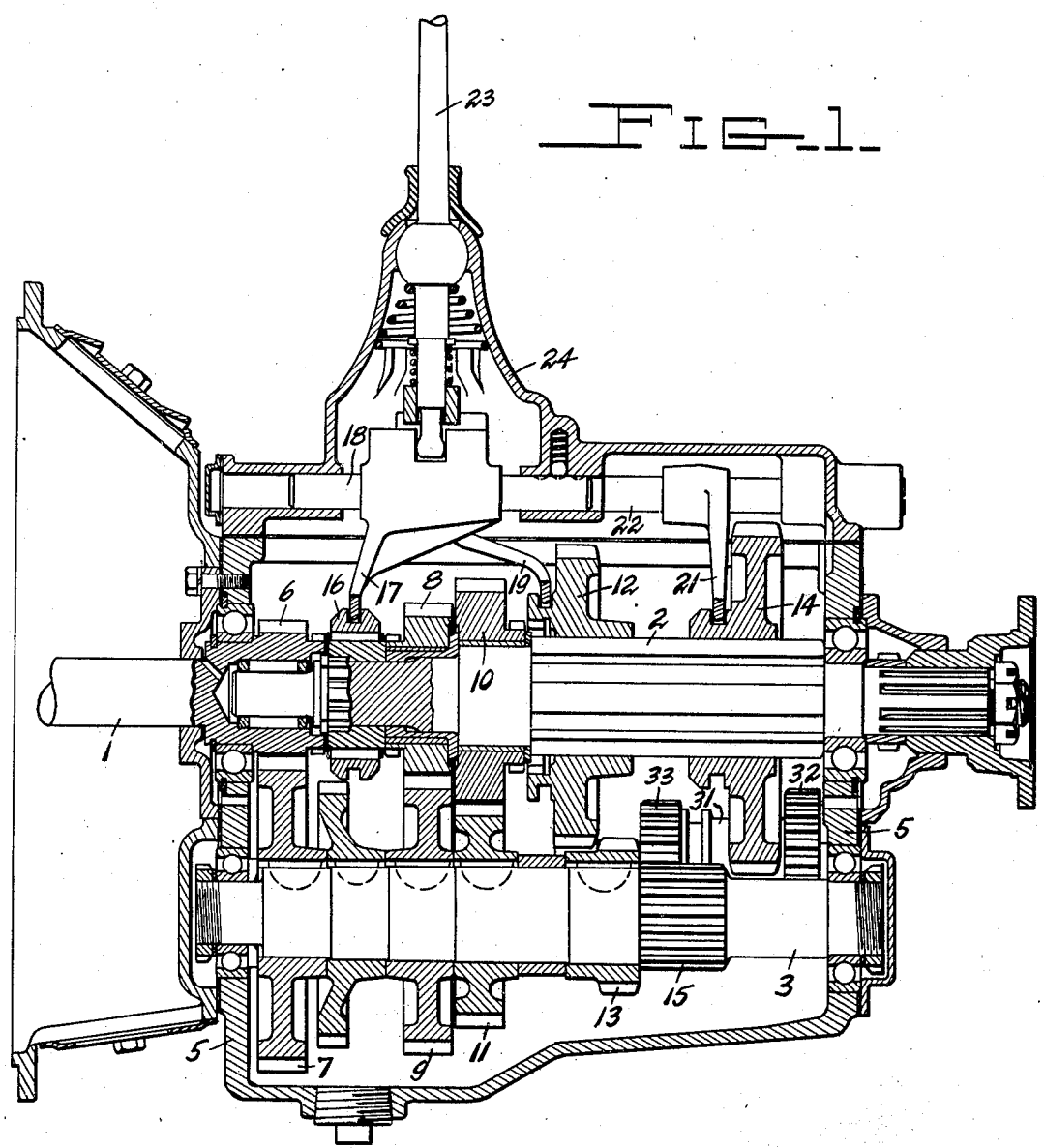

Patented Apr. 30, 1935

1,999,615

UNITED STATES PATENT OFFICE 1,999,615

TRANSMISSION GEARING (HIGH REVERSE GEAR)

Carl D. Peterson, Toledo, Ohio, assignor to Spicer Manufacturing Corporation, Toledo, Ohio, a corporation of Virginia Application July 24, 1933, Serial No. 681,908

1 Claim. (Cl. 74—343)

This invention relates to change speed transmission gears of the sliding gear type wherein the gears, or some of them, are slidably mounted on the transmission shaft of the gearing, and has for its object, a construction wherein a conventional change speed gearing with one reverse can be provided with an additional or high speed reverse which coacts with one of the shiftable gears on the transmission shaft, and particularly which coacts with the low speed gear on the transmission shaft which is also shiftable in one direction from neutral by its shift rod to produce low speed forward, and in the opposite direction by the same shift rod to produce low reverse speed.

It further has for its object, a construction by which a conventional change speed gearing of this type can be optionally provided with a high speed reverse shiftable to connect with the countershaft and with the low speed forward gear, or the same gear which is shiftable to produce either low speed forward, or normal reverse.

Other objects will appear throughout the specification.

The invention consists in the novel features and in the combination and constructions hereinafter set forth and claimed.

In describing this invention, reference is had to the accompanying drawings in which like characters designate corresponding parts in all the views.

Figure 1 is a longitudinal, sectional view of a gearing embodying my invention.

Figure 2 is a fragmentary plan view with the gear box shown in section.

Figures 3 and 4 are diagrammatic views illustrating the different positions of the gears for obtaining low speed reverse and high speed reverse.

I have here illustrated my invention as embodied in a five speed transmission.

1 designates the drive shaft; 2 the transmission shaft, and 3 the countershaft, the drive shaft and the transmission shaft being mounted in suitable bearings in axial alinement in the front and rear walls 5 of a gear box, and the countershaft being also mounted, in any well known manner, in the front and rear walls of the gear box.

6 and 7 are respectively intermeshing gears mounted on the drive shaft 1 and the countershaft 3 for driving the countershaft.

8 and 9 are a pair of intermeshing gears mounted respectively on the transmission shaft 2 and the countershaft 3.

10 and 11 are another pair of gears for producing another speed.

12 and 13 are another pair of gears, and 14 and 15 still another pair, the gear 14 being a low speed gear and shiftable into mesh with the gear 15 for the low speed forward. The pairs of gears 8 and 9; 10 and 11 are permanently in mesh, and the gears 8 and 10 are rotatably mounted on the transmission shaft 2, and are connected to said shaft to rotate therewith by shiftable clutches. The gears 12 and 14 are shiftable axially of the transmission shaft 2 into mesh with the gears 13 and 15 respectively, and also the gear 14 is shiftable into mesh with the reverse gear, as will be presently described.

16 is a high speed clutch shiftable in one direction, as to the left from neutral, for clutching the shafts 1 and 2 together in direct drive relation, and in the other direction from neutral, to clutch the gear 8 to the shaft 2. The clutch 16 is shifted by a suitable fork 17 carried by a shift rod 18. The gear 12 carries a clutch face on one side thereof and is shiftable in one direction from neutral to clutch the gear 10 to the transmission shaft 2, and in the other direction from neutral to bring the gear 12 into mesh with the gear 13 on the countershaft 3. The gear 12 is shifted by means of a fork 19 connected to a shift rod not shown. The low speed gear 14 is shifted by means of a fork 21 on a shift rod 22, and is shiftable in one direction from neutral into mesh with the companion gear 15 on the countershaft to produce low speed forward, and in the other direction from neutral into mesh with the reverse gear, to be presently described. These shift rods and an additional high speed reverse shift rod, to be hereinafter described, are operated by a gear shifting lever 23 having a selecting and shifting movement, and suitably mounted in the cover 24 of the gear box in the usual manner.

Low speed reverse, or normal reverse, is effected through a reverse gear idler which is part of what, for convenience, is called a spool.

25 designates the spool mounted on a shaft 26 which in turn is mounted in the rear wall of the gear box and in a rib or web 27 in the gear box, this spool having gears 28 and 29 at its ends, the gear 29 being permanently in mesh with the gear provided on the countershaft, it being here shown as in mesh with a continuation of the teeth of the gear 15. Shifting of the low speed gear 14 forward by its shift rod 22 brings it into mesh with the gear 15 to produce low speed forward, and shifting of the low speed gear 14 rearwardly brings it into mesh with the gear 28 of the spool 25 producing normal low reverse. When shifted rearward, it is incidentally in mesh with one of the gears of the high reverse spool, which spool is normally disconnected from the countershaft.

The construction thus far described per se, forms no part of this invention, and this invention relates primarily to providing another reverse, preferably a high speed reverse in the conventional gear box and coacting with the low speed gear 14. This additional, or high reverse, is provided by mounting a second spool in the gear box on the opposite side of the countershaft 3 to that on which the normal reverse spool 25 is located, and in mounting the high reverse spool so that it shifts axially to bring one of its gears into mesh with one of the gears on the countershaft 3 used in producing forward speed, and at the same time to bring its other gear into mesh with one of the standard gears on the transmission shaft 2 as the low speed gear 14.

31 designates a high reverse spool, this having gears 32 and 33 at its opposite ends and being mounted upon a shaft 34 to slide axially thereof, the shaft 34 being mounted in the rear wall of the gear box and in a web or rib 35 similar to the web or rib 27 in much the same manner that the normal reverse spool 25 is mounted, except that the spool 31 is shiftable axially. When shifted forwardly, or to the left Figures 1 and 2, from normal position, the gear 33 is shifted into mesh with the gear 13 on the countershaft 3 which also meshes with the gear 12 on the transmission shaft 2, when it is shifted rearwardly from neutral. At the same time that the gear 33 is brought into mesh with the gear 13, the gear 32 is brought into mesh with the low speed gear 14, so that now the motion is transmitted from the countershaft to the transmission shaft through the spool 31.

The high reverse spool 31 is shifted by means of a fork on a shift rod operated by the selecting and gear shifting lever 23.

In operation, when starting from low and working up to high speed, the shift rods are manipulated in the usual manner, and when it is desired to back up the vehicle at a high speed for a considerable distance, the gear shifting lever is shifted from neutral to select the high reverse shift rod and the high reverse spool 31 thus selected is shifted to bring its gears 33 and 32 into mesh respectively with the gears 13 on the countershaft 3 and the low speed gear 14.

By this construction, a standard transmission gear can be readily provided with an additional high reverse by merely the addition of the high reverse spool as the gear box is made standard with the necessary ribbing to stiffen it and to support both the low reverse spool and the high reverse spool.

What I claim is:

In a selective transmission gearing having slidable gears and including driving and transmission shafts in axial alinement, a countershaft, drive gears between the drive shaft and the countershaft, sets of change speed gears between the countershaft and the transmission shaft, some of the gears on the transmission shaft being shiftable and including a low speed gear, a pair of reverse gear spools, the low speed gear being shiftable in one direction from neutral into mesh with a gear on the countershaft to produce low speed, and in the opposite direction from neutral into mesh with one of said spools to produce reverse speed, and the other spool being shiftable into and out of mesh with a gear on the countershaft and with said low speed gear, when in neutral, to produce another reverse speed.

CARL D. PETERSON.